(12) United States Patent  
Benson et al.

(10) Patent No.: US 9,006,952 B2  
(45) Date of Patent: Apr. 14, 2015

(54) COIL BOBBIN FOR BRUSHLESS ALTERNATOR

(75) Inventors: Dale Benson, Lloydminster (CA); Ron Heidel, Lloydminster (CA)

(73) Assignee: All-Tek Maintenance Ltd., Lloydminster (CA)

( * ) Notice: Subject to any disclaimer, the term of this patent is extended or adjusted under 35 U.S.C. 154(b) by 226 days.

(21) Appl. No.: 13/527,506

(22) Filed: Jun. 19, 2012

(65) Prior Publication Data

US 2013/0241341 A1    Sep. 19, 2013

(30) Foreign Application Priority Data

Mar. 16, 2012    (CA) ..................................... 2771956

(51) Int. Cl.
*H02K 3/32*    (2006.01)
*H02K 3/51*    (2006.01)

(52) U.S. Cl.
CPC ......................... *H02K 3/51* (2013.01)

(58) Field of Classification Search
CPC ......... H02K 16/04; H02K 3/525; H02K 3/30; H02K 3/32; H01B 17/56
USPC .................................................. 310/194, 263
See application file for complete search history.

(56) References Cited

U.S. PATENT DOCUMENTS

| | | | |
|---|---|---|---|
| 5,097,169 A * | 3/1992 | Fukushima .................... | 310/194 |
| 5,239,742 A * | 8/1993 | Kobayashi et al. ............. | 29/596 |
| 6,433,457 B1 * | 8/2002 | Nakamura .................... | 310/263 |
| 6,967,423 B2 | 11/2005 | Kuroda | |
| 7,449,806 B2 | 11/2008 | Hamada | |
| 7,514,837 B2 | 4/2009 | Kuroda | |
| 7,759,838 B2 | 7/2010 | Bradfield | |
| 7,884,524 B2 | 2/2011 | Kuroda | |
| 2004/0041494 A1 | 3/2004 | Suzuki | |
| 2004/0245863 A1 * | 12/2004 | Hong et al. ..................... | 310/14 |
| 2010/0072838 A1 * | 3/2010 | Bradfield et al. ............... | 310/61 |

FOREIGN PATENT DOCUMENTS

JP    1-122343 A    5/1989
JP    9-252572 A    9/1997

OTHER PUBLICATIONS

Examination Report mailed Aug. 5, 2014, in corresponding Canadian Application No. 2771956, filed Mar. 16, 2012, 3 pages.
Examination Report mailed Nov. 12, 2014, in corresponding Canadian Application No. 2,771,956, filed Mar. 16, 2012, 4 pages.

* cited by examiner

*Primary Examiner* — Michael Andrews
(74) *Attorney, Agent, or Firm* — Christensen O'Connor Johnson Kindness PLLC

(57)    ABSTRACT

A coil bobbin for a brushless alternator includes an integrally formed one piece bobbin body that has a first end, a second end and a central passage that extends from the first end to the second end. A coil support portion of the body is positioned at the first end and has a first cylinder of a first diameter bordered by flanges which extend past the first cylinder. A base portion of the body is positioned at the second end. A bobbin extension portion is positioned between the coil support portion and the base portion. The bobbin extension portion includes a second cylinder of a second diameter which is smaller than the first diameter.

3 Claims, 3 Drawing Sheets

COIL BOBBIN FOR BRUSHLESS ALTERNATOR

FIELD

There is described a coil bobbin that was developed for use in a brushless alternator.

BACKGROUND

It is recognized that the coil bobbin configuration of a brushless alternator can have a significant effect on performance. Examples of unique coil bobbin configurations are U.S. Pat. No. 6,967,423 (Kuroda et al) entitled "Brushless Alternator Field Coil Bobbin Apparatus" and U.S. Pat. No. 7,759,838 (Bradfield et al) entitled "Coil Support For Rotating Electrical Machine." There will hereinafter be described a unique coil bobbin that was developed to be both compact and inexpensive enough for large scale usage on industrial skid engine power units.

SUMMARY

There is provided a coil bobbin for a brushless alternator. The coil bobbin has an integrally formed one piece bobbin body with a first end, a second end and a central passage that extends from the first end to the second end. A coil support portion of the body is positioned at the first end. The coil support portion has a first cylinder of a first diameter bordered by flanges which extend past the first cylinder. A base portion of the body is positioned at the second end. A bobbin extension portion is positioned between the coil support portion and the base portion. The bobbin extension portion has a second cylinder of a second diameter smaller than the first diameter.

The coil bobbin described above allows for a very compact design which is compatible with existing mounting methods of current brushed alternators. The coil bobbin was designed to allow greater air flow through the alternator while still allowing enough room in the back of the rear housing for all the electronics to be mounted inside the unit. We achieved this design by mounting the coil support portion on the bobbin extension portion or "stand-off" portion. The bobbin extension portion or "stand-off" portion has a smaller diameter than the coil support portion to allow more room for electronic components and more air to flow over electronics and through the alternator which is being pulled through the alternator by a fan mounted externally on the front of the alternator. The length of the bobbin extension portion or "stand-off" portion is such to position the coil bobbin properly inside the spinning rotor assembly.

It is preferred that the base portion is a flange having two or more flange segments. By cutting the flange into segments the base can be shaped to fit the open areas in the inside of and on the back end of the rear housing that are left after the electronics are fitted in place.

It is also preferred that an alignment ring is secured to an exterior face of the base portion. This is of assistance in centering the coil bobbin in an alternator.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
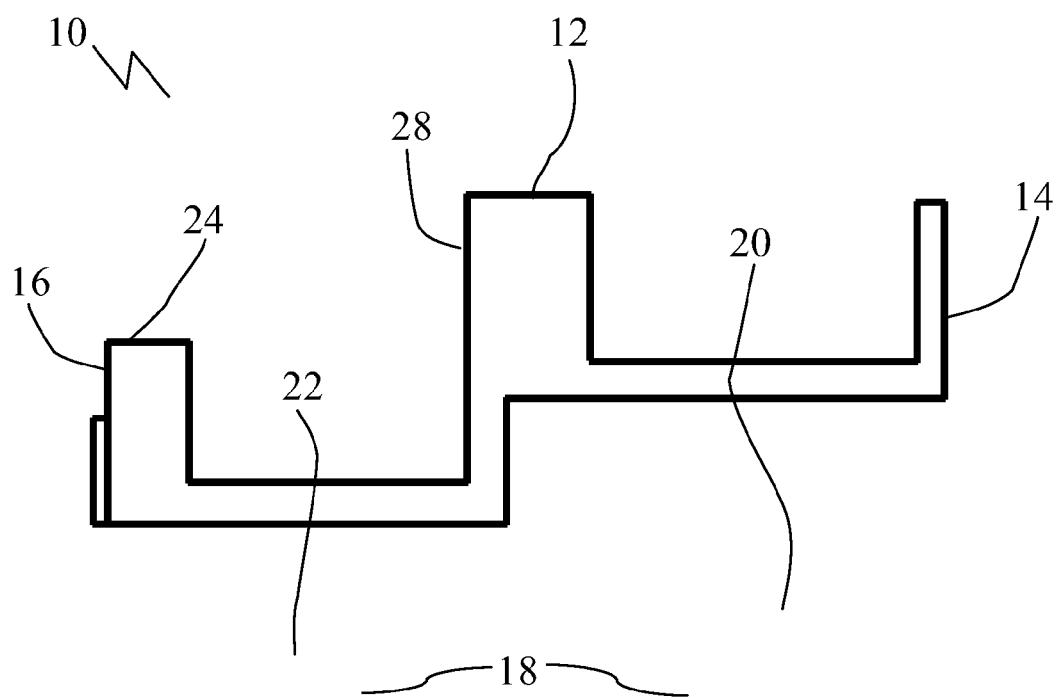
FIG. 1 is a side elevation view of a coil bobbin for a brushless alternator.
Figure 1:
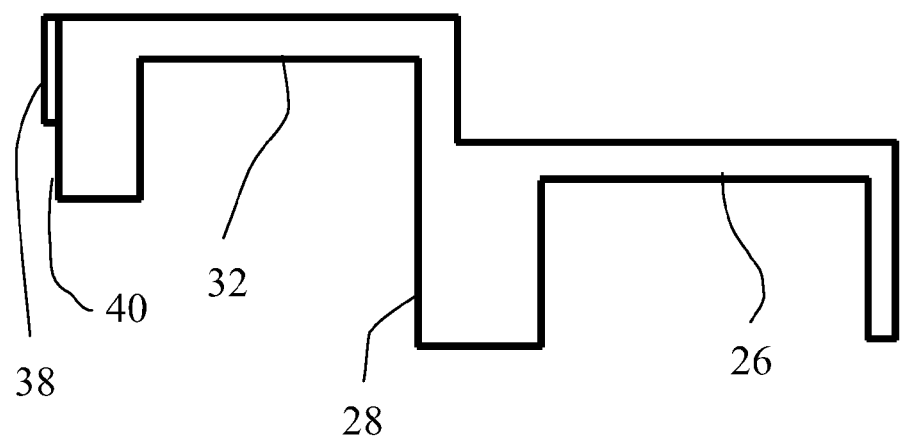

A coil bobbin for a brushless alternator generally identified by reference numeral 10, will now be described with reference to FIG. 1 through 3.

Structure and Relationship of Parts:

Referring to FIG. 1, a coil bobbin for a brushless alternator 10 includes an integrally formed one piece bobbin body 12 which has a first end 14, a second end 16 and a central passage 18 that extends from first end 14 to second end 16. Bobbin body 12 defines a coil support portion 20 and a bobbin extension portion 22 and has a base portion 24 at second end 16. Coil support portion 20 of bobbin body 12 is positioned at first end 14 and is made up of a first cylinder 26 of a first diameter bordered by flanges 28 which extend past first cylinder 26. Bobbin extension portion 22 is positioned between coil support portion 20 and base portion 24 and has a second cylinder 32 of a second diameter which is smaller than the first diameter. The positioning of bobbin extension portion 22 creates a large opening for air flow and room for mounting of electronics such as voltage regulators and rectifiers (not shown in figures).

Figure 2:
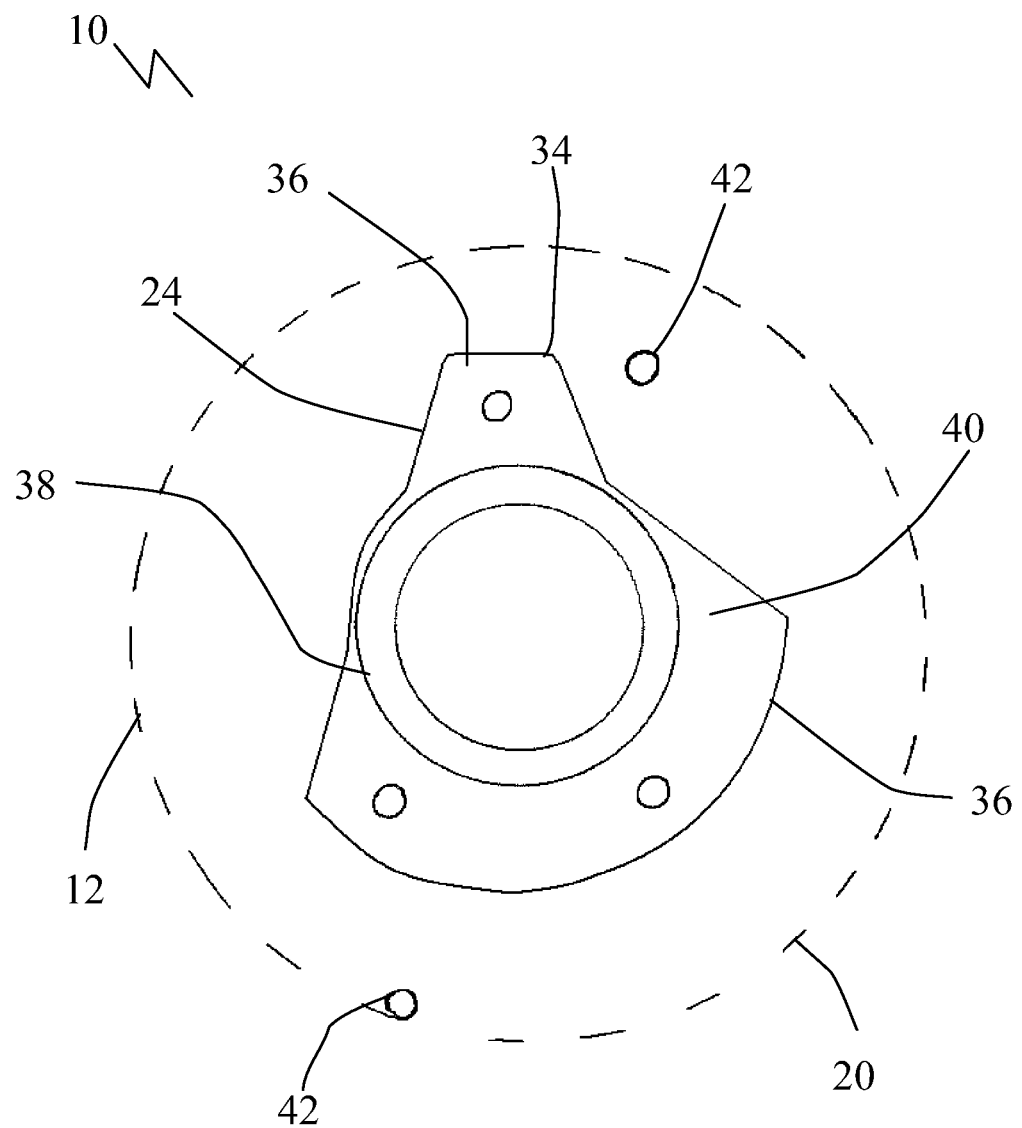
FIG. 2 is a bottom plan view, partially in section, of the coil bobbin for a brushless alternator shown in FIG. 1.

Referring to FIG. 2, base portion 24 of bobbin body 12 is preferably a flange 34 with two or more flange segments 36. By cutting flange 34 into flange segments 36, base can be shaped to fit the open areas in the inside of and on the back end of the rear housing (not shown) that are left after electronics are fitted in place. An alignment ring 38 is secured to an exterior face 40 of base portion 24 to assist in centering coil bobbin 10 in an alternator.

Figure 3:
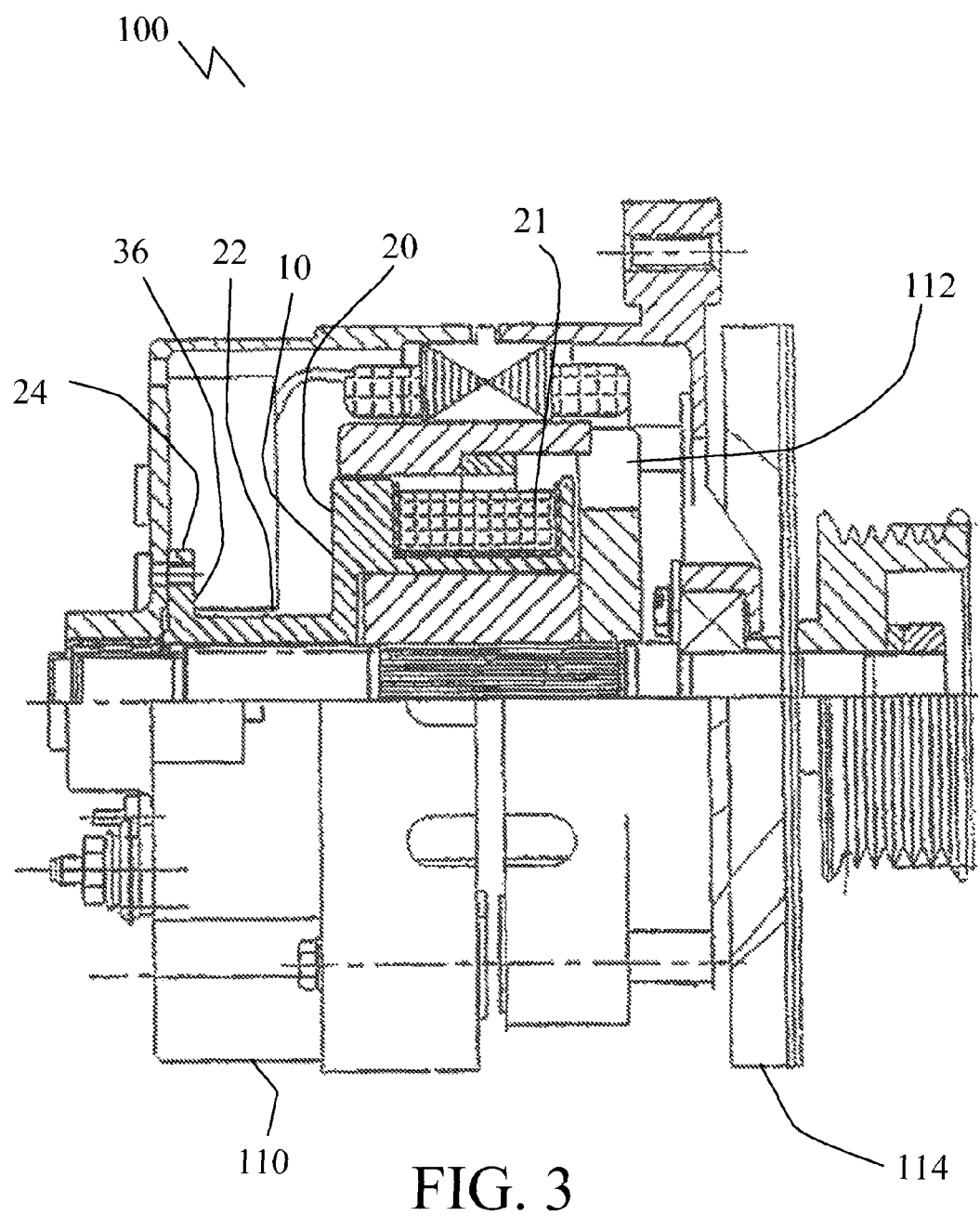
FIG. 3 is a side elevation view, partially in section, of the coil bobbin for a brushless alternator shown in FIG. 1 positioned within an alternator.

Referring to FIG. 3, coil support portion 20 is wound with wire 21 to magnetize the rotor as is done in any brushless alternator. Referring to FIG. 2, the windings come through holes 42 for connection to a voltage regulator (not shown).

Operation:

Referring to FIG. 3, base 24 of coil bobbin 10 is mounted in an alternator 100. Flange segments 36 allow base 24 to be shaped to fit the open areas in the inside of and on the back end of the rear housing 110 left after electronics (not shown) are fitted in place. Referring to FIG. 2, alignment ring 38 is positioned between base 24 and the mounting position in the alternator (not shown in this figure) to assist in centering coil bobbin 10 within alternator 100. Referring to FIG. 3, bobbin extension portion 22 allows for increased air flow through coil bobbin 10 to electronics (not shown). A fan 114 positioned within alternator 100 helps to create the air flow through coil bobbin 10. Bobbin extension portion 22 is of a length to position coil support portion 20 properly inside a spinning rotor assembly 112.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the preferred embodiments set forth in the examples, but should be given a broad purposive interpretation consistent with the description as a whole.

What is claimed is:

1. A coil bobbin for a brushless alternator, comprising:
   an integrally formed one piece bobbin body having a first end, a second end and a central passage that extends from the first end to the second end;
   a coil support portion of the body at the first end, the coil support portion comprising a first hollow cylinder having a first inner diameter and being bordered by flanges which extend past the first cylinder;
   a base portion of the body at the second end; and
   a bobbin extension portion positioned between the coil support portion and the base portion, the bobbin extension portion comprising a second hollow cylinder having a second inner diameter that is smaller than the first inner diameter.

2. The coil bobbin of claim 1, wherein the base portion is comprised of a flange having a first side, a second side, and two or more flange segments that define a passage through the flange between the first side and the second side.

3. The coil bobbin of claim 1, wherein an alignment ring is secured to an exterior face of the base portion, whereby the coil bobbin is centered in an alternator.

* * * * *